United States Patent
Hsu et al.

(10) Patent No.: US 9,853,336 B2
(45) Date of Patent: Dec. 26, 2017

(54) BATTERY PACK ASSEMBLY

(71) Applicant: GM GLOBAL TECHNOLOGY OPERATIONS LLC, Detroit, MI (US)

(72) Inventors: Chih-Cheng Hsu, Bloomfield Township, MI (US); Zhongying Shi, Cupertino, CA (US); Alexander Bilinski, Avoca, MI (US); Bao Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 14/990,426

(22) Filed: Jan. 7, 2016

(65) Prior Publication Data

US 2017/0200990 A1 Jul. 13, 2017

(51) Int. Cl.
*H01M 10/613* (2014.01)
*H01M 10/6566* (2014.01)
*H01M 10/52* (2006.01)
*H01M 2/10* (2006.01)

(52) U.S. Cl.
CPC ....... *H01M 10/613* (2015.04); *H01M 2/1077* (2013.01); *H01M 10/52* (2013.01); *H01M 10/6566* (2015.04)

(58) Field of Classification Search
CPC ............. H01M 10/613; H01M 10/617; H01M 10/625; H01M 2/1077; H01M 10/6566; H01M 10/6562; H01M 10/52
See application file for complete search history.

(56) References Cited

U.S. PATENT DOCUMENTS

| 2006/0068278 | A1* | 3/2006 | Bloom ................... H01B 3/025 429/176 |
| 2010/0136402 | A1* | 6/2010 | Hermann ............ H01M 2/1077 429/120 |
| 2013/0209844 | A1* | 8/2013 | Gless .................. H01M 2/1077 429/61 |

* cited by examiner

*Primary Examiner* — Carlos Barcena
(74) *Attorney, Agent, or Firm* — Quinn IP Law

(57) ABSTRACT

A battery pack assembly includes a tray and a battery disposed in the tray. The battery pack assembly also includes an absorption member disposed in the tray and configured to wick moisture out of the tray and away from the battery.

20 Claims, 2 Drawing Sheets

BATTERY PACK ASSEMBLY

TECHNICAL FIELD

The present disclosure relates to a battery pack assembly.

BACKGROUND

Some vehicles include a battery array that is housed in a container. The battery array can create heat, and therefore, a cooling system can be utilized to cool the battery array.

SUMMARY

The present disclosure provides a battery pack assembly including a tray and a battery disposed in the tray. The battery pack assembly also includes an absorption member disposed in the tray and configured to wick moisture out of the tray and away from the battery.

The present disclosure also provides another battery pack assembly. The battery pack assembly includes a tray, and the tray includes a bottom wall and a side wall extending outwardly away from the bottom wall to present a space between the bottom wall and the side wall. The battery pack assembly further includes a battery disposed in the space of the tray such that the side wall surrounds the battery. Additionally, the battery pack assembly includes an inlet component disposed in the tray and configured to guide a gaseous fluid into the tray and across the battery inside the space of the tray. The battery pack assembly also includes an outlet component disposed in the tray and spaced from the inlet component. The battery is disposed between the inlet component and the outlet component. The outlet component is configured to guide the gaseous fluid out of the tray away from the battery. In addition, the battery pack assembly includes an absorption member disposed in the space of the tray and through the outlet component such that a first portion of the absorption member is disposed inside the outlet component and a second portion of the absorption member is disposed outside of the outlet component. The second portion is disposed adjacent to the bottom wall of the tray such that the second portion is configured to wick moisture from the bottom wall of the tray to the first portion inside the outlet component which allows the gaseous fluid to be directed across the first portion inside the outlet component to direct the moisture out of the tray and away from the battery.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
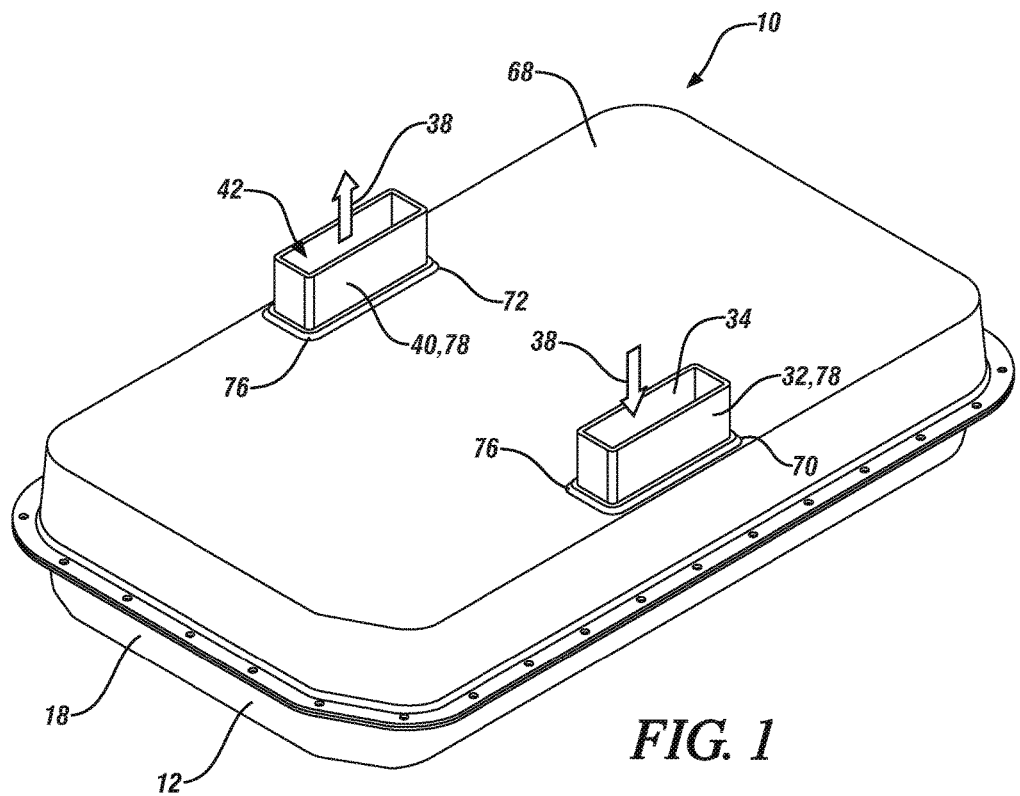
FIG. 1 is a schematic perspective view of a battery pack assembly.

Referring to the Figures, wherein like numerals indicate like or corresponding parts throughout the several views, a battery pack assembly 10 is generally shown in FIG. 1.

Figure 2:
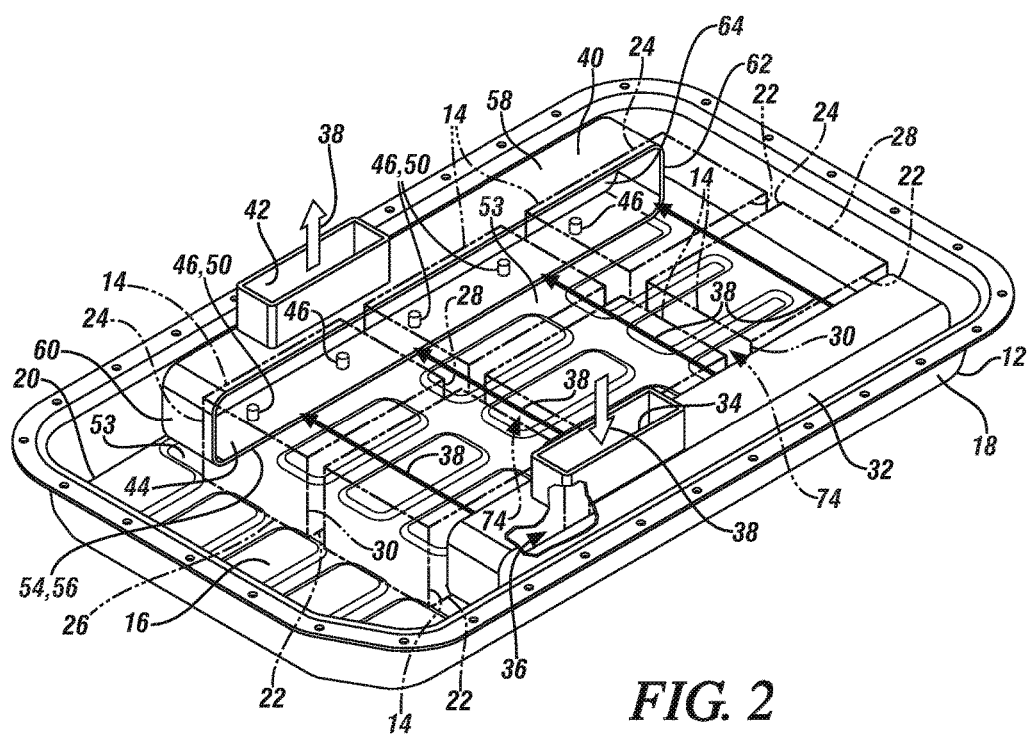
FIG. 2 is a schematic perspective view of the battery pack assembly with a cover removed and a plurality of batteries illustrated in phantom lines.

As best shown in FIG. 2, the battery pack assembly 10 includes a tray 12 and a battery 14 disposed in the tray 12. The battery 14 can store energy, and other components can utilize the stored energy of the battery 14 in order to energize or activate various components. When the battery 14 is in use, the battery 14 creates heat, and therefore it is desirable to cool the battery 14, which is discussed further below.

The battery pack assembly 10 can be utilized in a vehicle application or a non-vehicle application. Non-limiting examples of vehicles can include cars, trucks, motorcycles, boats, watercrafts, all-terrain vehicles, off-road vehicles, aircrafts, farm equipment or any other suitable vehicle. Non-limiting examples of non-vehicles can include machines, farm equipment or any other suitable non-vehicle.

In certain embodiments, the battery 14 is further defined as a plurality of batteries 14 disposed in the tray 12. FIG. 2 shows more than one battery 14 in phantom lines to illustrate the general locations that the batteries 14 can be located in the tray 12 for illustrative purposes only. It is to be appreciated that any suitable number of batteries 14 can be utilized. The batteries 14 can be any suitable energy storage device, and in certain non-limiting examples, the batteries 14 can be high voltage batteries, low voltage batteries or combinations thereof, and can be twelve volt battery cells, lithium ion batteries, etc.

Continuing with FIG. 2, the tray 12 can include a bottom wall 16 and a side wall 18 extending outwardly away from the bottom wall 16 to present a space 20 between the bottom wall 16 and the side wall 18. In certain embodiments, the battery 14 is disposed in the space 20 (of the tray 12) such that the side wall 18 surrounds the battery 14. In a vehicle application, the bottom wall 16 of the tray 12 can face the ground that the vehicle can travel across.

Furthermore, as shown in FIG. 2, the battery 14 can include a first side 22 and a second side 24, with the first and second sides 22, 24 opposing each other. The battery 14 can also include a third side 26 and a fourth side 28, with the third and fourth sides 26, 28 opposing each other. The first, second, third and fourth sides 22, 24, 26, 28 cooperate to present a perimeter 30 around the battery 14. When utilizing the plurality of batteries 14, each of the batteries 14 can include respective first, second, third and fourth sides 22, 24, 26, 28 that cooperate to present the perimeter 30 of respective batteries 14.

The battery pack assembly 10 can further include an inlet component 32 disposed in the tray 12. In certain embodiments, the inlet component 32 is disposed in the space 20 of the tray 12 such that the side wall 18 of the tray 12 surrounds the inlet component 32. The inlet component 32 is configured to guide a gaseous fluid into the tray 12 and across the battery 14. Therefore, the gaseous fluid moves across the battery 14 or batteries 14 inside the space 20 of the tray 12, and the gaseous fluid cools the battery 14 or batteries 14.

The gaseous fluid can be air that is fed into the inlet component 32 from a fan, a blower, an HVAC system or any other suitable apparatus/system that can move the gaseous fluid through the inlet component 32 and across the battery 14. For example, the gaseous fluid can be directed through the battery pack assembly 10 from the gaseous fluid inside a passenger compartment or directly from an air conditioner. Therefore, the air flow path can be from the passenger compartment/air conditioner and then move downstream to the battery pack assembly 10. The flow of the gaseous fluid to the battery pack assembly 10 does not negatively affect the performance of the HVAC system, the air conditioner. The amount of gaseous fluid and/or the temperature of the gaseous fluid that is directed to the battery pack assembly 10 can be controlled.

Continuing with FIG. 2, the inlet component 32 can define a first opening 34 and a second opening 36 in fluid communication with the first opening 34. The second opening 36 is disposed inside the tray 12 and the second opening 36 is open to the space 20 of the tray 12. The inlet component 32 is open along one side such that the second opening 36 faces the first side 22 of the battery 14. Specifically, the inlet component 32 is configured to guide the gaseous fluid into the tray 12 through the first and second openings 34, 36 and across the battery 14 inside the tray 12.

For example, the gaseous fluid from the fan/blower, etc., is directed through the first opening 34 and then into the second opening 36. The gaseous fluid then exits the second opening 36 and moves into the space 20 of the tray 12 and moves across the batteries 14. For illustrative purposes only, the direction of the flow of the gaseous fluid into and out of the battery pack assembly 10 is identified by the arrows labeled with reference number 38 in FIGS. 1 and 2.

Continuing with FIG. 2, the battery pack assembly 10 can include an outlet component 40 disposed in the tray 12 and spaced from the inlet component 32. In certain embodiments, the outlet component 40 is disposed in the space 20 such that the side wall 18 surrounds the outlet component 40. Also, in certain embodiments, the outlet component 40 is spaced from the bottom wall 16 of the tray 12 (best shown in FIG. 3). Generally, the battery 14 is disposed between the inlet component 32 and the outlet component 40. The outlet component 40 is configured to guide the gaseous fluid out of the tray 12 away from the battery 14. As such, the outlet component 40 is disposed downstream from the inlet component 32 and the battery 14/batteries 14. Therefore, as shown by the arrows labeled with reference number 38 (of FIG. 2), which identify the flow of the gaseous fluid, the gaseous fluid moves from the inlet component 32, across the battery 14 or batteries 14 and then out of the outlet component 40 away from the batteries 14 and the tray 12.

Again, continuing with FIG. 2, the outlet component 40 can define a first aperture 42 and a second aperture 44 in fluid communication with the first aperture 42. The second aperture 44 is disposed inside the tray 12 and is open to the space 20 of the tray 12. The outlet component 40 is open along one side such that the second aperture 44 faces the second side 24 of the battery 14. Specifically, the outlet component 40 is configured to guide the gaseous fluid out of the tray 12 through the first and second apertures 42, 44 and away from the battery 14.

For example, the gaseous fluid from the fan/blower, etc., is directed through the first opening 34 and then into the second opening 36 of the inlet component 32. The gaseous fluid then exits the second opening 36 into the space 20 in the tray 12 and moves across the batteries 14. Then the gaseous fluid enters the outlet component 40 through the second aperture 44. The gaseous fluid then travels from the second aperture 44 through the first aperture 42 and out of the battery pack assembly 10.

Figure 3:
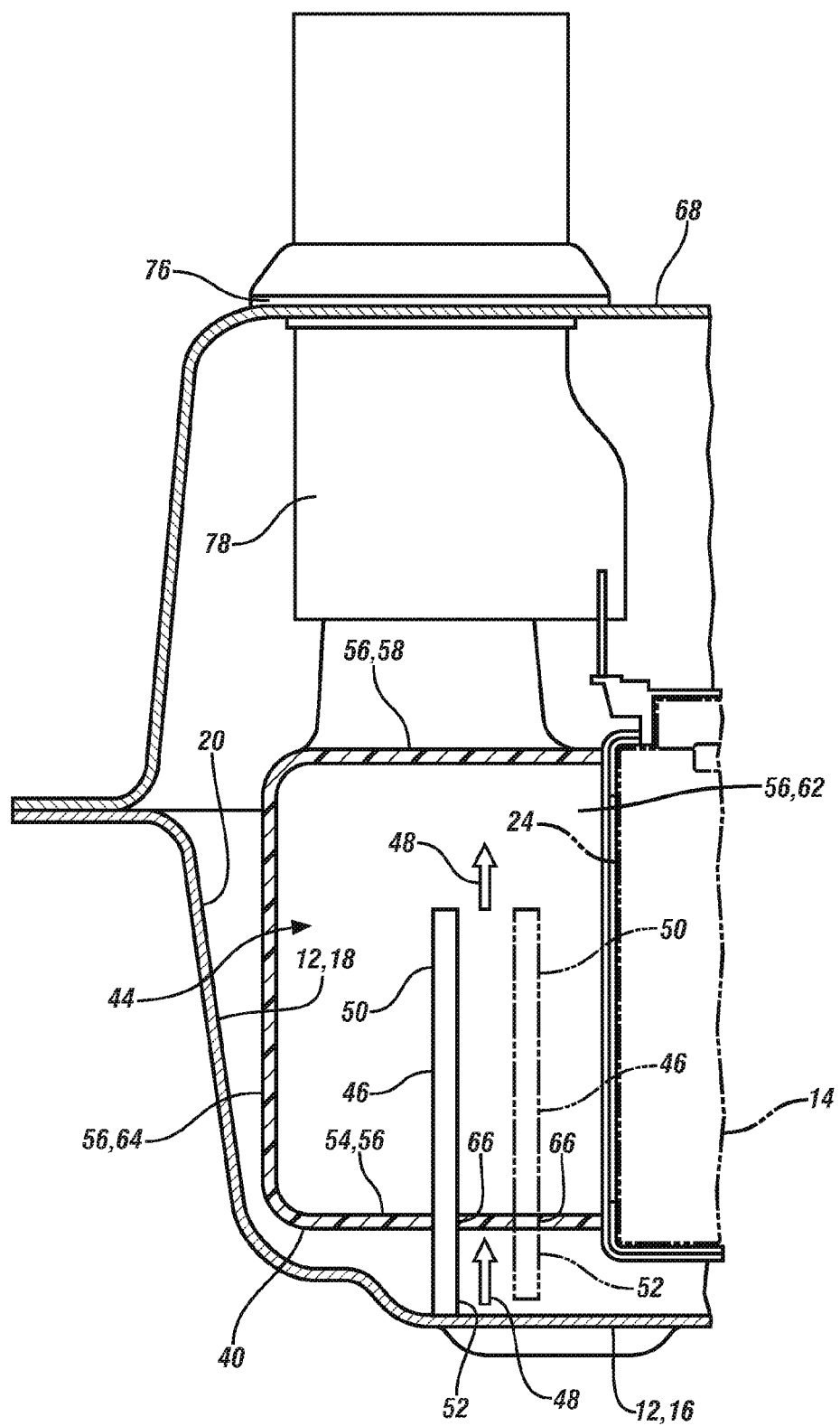
FIG. 3 is a schematic fragmentary cross-sectional view of an outlet component, a tray and the cover.

Referring to FIGS. 2 and 3, the battery pack assembly 10 also includes an absorption member 46 disposed in the tray 12. In certain embodiments, the absorption member 46 is disposed in the space 20 of the tray 12. The absorption member 46 is configured to wick moisture out of the tray 12 and away from the battery 14. Moisture can occur on the battery 14 or batteries 14, and this moisture can collect on the bottom wall 16 of the tray 12. The absorption member 46 collects the moisture to remove the moisture from the battery 14/batteries 14. The absorption member 46 can wick moisture therein by utilizing the capillary principle. By utilizing the absorption member 46, the battery pack assembly 10 can be located under a vehicle, such as a car, truck, etc., where water can access.

Generally, the absorption member 46 can be disposed closer to the outlet component 40 than the inlet component 32 such that the moisture is directed out of the tray 12 and away from the battery 14. In certain embodiments, the absorption member 46 is supported by the outlet component 40. In other embodiments, the absorption member 46 is supported by the tray 12 adjacent to the outlet component 40. For example, the absorption member 46 can be directly in front of the second aperture 44 relative to the direction of flow of the gaseous fluid. By locating the absorption member 46 by or partially inside the outlet component 40, the moisture collected by the absorption member 46 is directed out of the battery pack assembly 10 away from the battery 14/batteries 14, thus assisting in keeping the battery 14/batteries 14 dry. By removing moisture from the tray 12, short circuits between the batteries 14 can be reduced. Furthermore, if moisture remains in the tray 12, corrosion can occur on the battery 14/batteries 14, and therefore, by removing moisture from the tray 12, corrosion can be reduced. For illustrative purposes only, the direction of the flow of the moisture from the bottom wall 16 of the tray 12 through the absorption member 46 is identified by the arrows labeled with reference number 48 in FIG. 3.

Referring to FIG. 3, the absorption member 46 can be disposed through the outlet component 40 such that a first portion 50 of the absorption member 46 is disposed inside the outlet component 40 and a second portion 52 of the absorption member 46 is disposed outside of the outlet component 40. More specifically, the first portion 50 of the absorption member 46 can be disposed inside the second aperture 44 and the second portion 52 of the absorption member 46 can be disposed outside of the second aperture 44. In certain embodiments, the second portion 52 of the absorption member 46 is disposed between the bottom wall 16 of the tray 12 and the outlet component 40.

The absorption member 46 is configured to wick the moisture out of the tray 12 and away from the battery 14 by positioning the first portion 50 of the absorption member 46 inside the second aperture 44 such that the gaseous fluid is directed across the first portion 50 before the gaseous fluid exits the outlet component 40. Furthermore, the second portion 52 is disposed adjacent to the bottom wall 16 of the tray 12 such that the second portion 52 is configured to wick moisture from the bottom wall 16 of the tray 12 to the first portion 50 inside the outlet component 40 which allows the gaseous fluid to be directed across the first portion 50 inside the outlet component 40 to direct the moisture out of the tray 12 and away from the battery 14. Additionally, as the gaseous fluid travels across the battery 14/batteries 14, heat from the batteries 14 operating can be transferred to the gaseous fluid, which warms the gaseous fluid, and the warm gaseous fluid further assists in removing the moisture from the absorption member 46.

In certain embodiments, as shown in FIG. 3, the absorption member 46 can engage the bottom wall 16 of the tray 12 to wick the moisture from the bottom wall 16. Specifically, the second portion 52 can engage the bottom wall 16 and the moisture is first drawn into the second portion 52, and then the moisture travels into the first portion 50 inside the second aperture 44 to be directed out of the tray 12 through the first aperture 42 of the outlet component 40.

In other embodiments, as shown in FIG. 3 by the phantom lines representing another absorption member 46, the absorption member 46 can be spaced from the bottom wall 16 of the tray 12 to wick the moisture from the bottom wall 16. For example, as the moisture builds on the bottom wall 16 of the tray 12, the absorption member 46 will begin to wick the moisture from the bottom wall 16 when the moisture becomes close enough to the absorption member 46 to cause wicking to occur in the absorption member 46.

In certain embodiments, the absorption member 46 is further defined as a plurality of absorption members 46 (see FIGS. 2 and 3) spaced from each other along the outlet component 40. Each of the absorption members 46 can include the first and second portions 50, 52 as discussed above. Specifically, each of the absorption members 46 can include all of the features of the single absorption member 46 discussed herein. Therefore, the first portion 50 of each of the absorption members 46 is disposed inside the second aperture 44 and the second portion 52 of each of the absorption members 46 is disposed between the bottom wall 16 of the tray 12 and the outlet component 40.

Generally, the absorption member(s) 46 can be formed of a material that draws moisture therein. For example, the material of the absorption member(s) 46 can include at least one of a ceramic and a fabric. The phrase "at least one of" as used herein should be construed to include the non-exclusive logical "or", i.e., ceramic and/or fabric. As another example, the absorption member(s) 46 can be a sponge-like material or a brick-like material. When utilizing a plurality of absorption members 46, one or more of the absorption members 46 can be formed of the same material, and one or more of other absorption members 46 can be formed of another material, or a combination thereof. It is to be appreciated that the above examples are non-limiting examples, and other material(s) can be utilized if the material(s) can draw moisture therein.

The absorption members 46 can be arranged in any suitable orientation and location, and FIG. 2 is one non-limiting example of the absorption members 46 spaced from each other in a row. FIG. 3 illustrates one of the absorption members 46 in phantom lines to provide another non-limiting example that some of the absorption members 46 can be stacked one in front of the other relative to the direction of flow of the gaseous fluid. Optionally, the bottom wall 16 of the tray 12 can define one or more depressions 53 which can assist in guiding the moisture toward the absorption members 46. When utilizing the depressions 53, one or more of the absorption members 46 align in the depressions 53 to wick the moisture that pools in the depressions 53.

Turning to FIG. 2, the outlet component 40 can include a base wall 54 spaced from and facing the bottom wall 16. In certain embodiments, the base wall 54 is generally parallel to the bottom wall 16. The base wall 54 generally defines a boundary 56 of the second aperture 44. More specifically, the outlet component 40 can include the base wall 54, a top wall 58, a first side wall 60, a second side wall 62 and a third side wall 64, with the base wall 54, the top wall 58 and the first, second, and third side walls 60, 62, 64 cooperating to define the boundary 56 of the second aperture 44. The first, second and third side walls 60, 62, 64 connect with the base wall 54 and the top wall 58 to space the base wall 54 and the top wall 58 apart. Furthermore, the first aperture 42 can be defined through the top wall 58, and the second aperture 44 is open to the space 20 of the tray 12, i.e., the walls 54, 58, 60, 62, 64 do not cooperate to completely enclose the second aperture 44. Said differently, the walls 54, 58, 60, 62, 64 cooperate to surround the second aperture 44 except for one side which allows the second aperture 44 to be open to the space 20 that faces the second side 24 of the battery 14.

In certain embodiments, the absorption member 46, and more specifically the absorption members 46, is disposed through the base wall 54. For example, the base wall 54 can define one or more cutouts 66 (see FIG. 3) with the absorption members 46 disposed in respective cutouts 66. The absorption members 46 can be secured or attached to the outlet component 40, and more specifically the base wall 54, by adhesive, fasteners, welding, molding, interference fit or any other suitable method.

Referring to FIG. 1, the battery pack assembly 10 can also include a cover 68 attached to the tray 12 to contain the battery 14/batteries 14 therein. The cover 68 can define a first hole 70 and a second hole 72 spaced from each other. Generally, the inlet component 32 cooperates with the first hole 70 to guide the gaseous fluid into the tray 12, and the outlet component 40 cooperates with the second hole 72 to guide the gaseous fluid out of the tray 12. The cover 68 can include one or more additional holes, for electrical wires to extend therethrough to electrically connect the battery 14 or batteries 14 to other components.

In certain embodiments, the batteries 14 are contained inside the cover 68 and the tray 12. Generally, the batteries 14 are spaced from each other to present a gap 74 (see FIG. 2) between respective batteries 14 in which the gaseous fluid is directed through the gap 74 of the batteries 14 to cool the batteries 14. As the gaseous fluid travels across the battery 14/batteries 14 through the gaps 74, heat from the batteries 14 operating can be transferred to the gaseous fluid, which warms the gaseous fluid, and the warm gaseous fluid further assists in removing the moisture from the absorption member(s) 46.

The inlet and outlet components 32, 40 can be supported by the tray 12 and/or the cover 68. Furthermore, as shown in FIG. 1, the battery pack assembly 10 can also include a plurality of gaskets or seals 76. One of the gaskets 76 can minimize fluid communication around the first hole 70 between an outer surface of the inlet component 32 and the cover 68. Additionally, another one of the gaskets 76 can minimize fluid communication around the second hole 72 between an outer surface of the outlet component 40 and the cover 68. The inlet and outlet components 32, 40 can each include an extension 78 (see FIGS. 1 and 3) that is disposed through respective first and second holes 70, 72. The extension 78 of the inlet component 32 extends the first opening 34 from outside of the cover 68 to inside the tray 12, and similarly, the extension 78 of the outlet component 40 extends the first aperture 42 from inside the tray 12 to outside of the cover 68. The gaskets 76 can surround respective extensions 78. Furthermore, yet another one of the gaskets 76 can be utilized between the tray 12 and the cover 68 to minimize fluid communication into the space 20 inside the cover 68 and the tray 12.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A battery pack assembly comprising:
   a tray;
   a battery disposed in the tray;
   an absorption member disposed in the tray and configured to wick moisture out of the tray and away from the battery;
   an inlet component disposed in the tray and configured to guide a gaseous fluid into the tray and across the battery; and
   an outlet component disposed in the tray and spaced from the inlet component, with the battery disposed between the inlet component and the outlet component and wherein the outlet component is configured to guide the gaseous fluid out of the tray away from the battery;
   wherein the absorption member is disposed closer to the outlet component than the inlet component such that the moisture is directed out of the tray and away from the battery.

2. The assembly as set forth in claim 1 wherein the absorption member is supported by the outlet component.

3. The assembly as set forth in claim 1 wherein the inlet component defines a first opening and a second opening in fluid communication with the first opening, and wherein the second opening is disposed inside the tray and the inlet component is open along one side such that the second opening faces a first side of the battery.

4. The assembly as set forth in claim 3 wherein the outlet component defines a first aperture and a second aperture in fluid communication with the first aperture, and wherein the second aperture is disposed inside the tray and the outlet component is open along one side such that the second aperture faces a second side of the battery, with the first and second sides of the battery opposing each other.

5. The assembly as set forth in claim 4 wherein the absorption member is disposed through the outlet component such that a first portion of the absorption member is disposed inside the second aperture and a second portion of the absorption member is disposed outside of the second aperture.

6. The assembly as set forth in claim 5 wherein the absorption member is further defined as a plurality of absorption members spaced from each other along the outlet component, with each of the absorption members including the first and second portions.

7. The assembly as set forth in claim 6 wherein:
   the tray includes a bottom wall and a side wall extending outwardly away from the bottom wall to present a space between the bottom wall and the side wall;
   the battery and the inlet and outlet components are disposed in the space such that the side wall surrounds the battery and the inlet and outlet components; and
   the outlet component is spaced from the bottom wall, with the second portion of the absorption members disposed between the bottom wall and the outlet component.

8. The assembly as set forth in claim 7 wherein the outlet component includes a base wall spaced from and generally parallel to the bottom wall, with the base wall defining a boundary of the second aperture, with the absorption members disposed through the base wall.

9. The assembly as set forth in claim 4 wherein the inlet component is configured to guide the gaseous fluid through the first and second openings and across the battery inside the tray, and the outlet component is configured to guide the gaseous fluid out of the tray through the first and second apertures and away from the battery, and wherein the absorption member is configured to wick the moisture out of the tray and away from the battery by positioning a first portion of the absorption member inside the second aperture such that the gaseous fluid is directed across the first portion before the gaseous fluid exits the outlet component.

10. The assembly as set forth in claim 1 further including a cover attached to the tray to contain the battery therein, with the cover defining a first hole and a second hole spaced from each other, with the inlet component cooperating with the first hole to guide the gaseous fluid into the tray and the outlet component cooperating with the second hole to guide the gaseous fluid out of the tray.

11. The assembly as set forth in claim 10 wherein the battery is further defined as a plurality of batteries contained inside the cover and the tray, and the batteries are spaced from each other to present a gap between respective batteries in which the gaseous fluid is directed through the gap of the batteries to cool the batteries.

12. The assembly as set forth in claim 1 wherein:
   the tray includes a bottom wall and a side wall extending outwardly away from the bottom wall to present a space between the bottom wall and the side wall;
   the battery and the inlet and outlet components are disposed in the space such that the side wall surrounds the battery and the inlet and outlet components; and
   the absorption member engages the bottom wall of the tray to wick the moisture from the bottom wall.

13. The assembly as set forth in claim 1 wherein the absorption member is formed of a material that draws moisture therein.

14. The assembly as set forth in claim 13 wherein the material of the absorption member includes at least one of a ceramic and a fabric.

15. The assembly as set forth in claim 1 wherein the absorption member is a sponge-like material.

16. A battery pack assembly comprising:
   a tray including a bottom wall and a side wall extending outwardly away from the bottom wall to present a space between the bottom wall and the side wall;
   a battery disposed in the space of the tray such that the side wall surrounds the battery;
   an inlet component disposed in the tray and configured to guide a gaseous fluid into the tray and across the battery inside the space of the tray;
   an outlet component disposed in the tray and spaced from the inlet component, with the battery disposed between the inlet component and the outlet component, and wherein the outlet component is configured to guide the gaseous fluid out of the tray away from the battery; and
   an absorption member disposed in the space of the tray and through the outlet component such that a first portion of the absorption member is disposed inside the outlet component and a second portion of the absorption member is disposed outside of the outlet component, and wherein the second portion is disposed adjacent to the bottom wall of the tray such that the second portion is configured to wick moisture from the bottom wall of the tray to the first portion inside the outlet component which allows the gaseous fluid to be directed across the first portion inside the outlet component to direct the moisture out of the tray and away from the battery.

17. The assembly as set forth in claim 16 wherein:

the outlet component defines a first aperture and a second aperture in fluid communication with the first aperture;

the outlet component includes a base wall, a top wall, a first side wall, a second side wall and a third side wall, with the first, second and third side walls connecting with the base wall and the top wall to space the base wall and the top wall apart, and wherein the base wall, the top wall and the first, second, and third side walls cooperate to define a boundary of the second aperture, with the first aperture defined through the top wall and the second aperture open to the space of the tray; and the base wall spaced from and facing the bottom wall, with the absorption member disposed through the base wall of the outlet component.

18. A battery pack assembly comprising:

a tray;

a battery disposed in the tray; and an absorption member disposed in the tray and configured to wick moisture out of the tray and away from the battery;

an inlet component disposed in the tray and configured to guide a gaseous fluid into the tray;

an outlet component disposed in the tray and spaced from the inlet component, with the battery disposed between the inlet component and the outlet component, wherein the outlet component is configured to guide the gaseous fluid out of the tray;

wherein the absorption member is supported by the outlet component.

19. The assembly as set forth in claim 18 wherein:

the tray includes a bottom wall;

the absorption member is disposed through the outlet component such that a first portion of the absorption member is disposed inside the outlet component and a second portion of the absorption member is disposed outside of the outlet component;

the second portion is configured to wick moisture from the bottom wall of the tray to the first portion inside the outlet component; and the gaseous fluid is directed across the first portion inside the outlet component to remove the moisture from the first portion of the absorption member.

20. The assembly as set forth in claim 19 wherein the outlet component includes a base wall spaced from the bottom wall of the tray, with the absorption member disposed through the base wall.

* * * * *